United States Patent

[11] 3,607,755

| [72] | Inventors | Kevin Paul Murphy<br>Bernardsville;<br>Richard Frederick Harry Stahl, Madison,<br>both of N.J. |
|---|---|---|
| [21] | Appl. No. | 778,759 |
| [22] | Filed | Nov. 25, 1968 |
| [45] | Patented | Sept. 21, 1971 |
| [73] | Assignee | Allied Chemical Corporation<br>New York, N.Y. |

[54] NOVEL HALOCARBON COMPOSITIONS
8 Claims, No Drawings

[52] U.S. Cl. ..................................................... 252/67,
252/305
[51] Int. Cl. ....................................................... C09k 3/02
[50] Field of Search ........................................... 252/67

[56] References Cited
UNITED STATES PATENTS

| 2,885,427 | 5/1959 | Ruh et al. ..................... | 260/653.7 |
| 3,085,065 | 4/1963 | Kvalnes ........................ | 252/67 |

Primary Examiner—John D. Welsh
Attorneys—Ernest A. Polin and Jay P. Friedenson

ABSTRACT: Dichlorodifluoromethane ($CCl_2F_2$) and 1,1,1,2-tetrafluoroethane ($CF_3CH_2F$), in certain proportions, form an azeotrope and essentially azeotropic mixtures, which are constant boiling, or essentially constant boiling, and which mixtures possess refrigeration capacities higher than either of the $CCl_2F_2$ and $CF_3CH_2F$ components alone. These mixtures are especially adapted for use in systems having high-condensing temperatures such as automobile air conditioning systems.

3,607,755

1

NOVEL HALOCARBON COMPOSITIONS

BACKGROUND OF THE INVENTION

The lower aliphatic hydrocarbons, when substituted by fluorine and chlorine, are well known to have potential as refrigerants. Many of these halocarbon materials exhibit certain desired properties for refrigerant purposes including low cost, low specific volume, low toxicity and nonflammability which characteristics have resulted in the extensive use of such compounds in a large number of refrigeration applications. Examples of such compounds include dichlorodifluoromethane ($CCl_2F_2$), b.p. $-21.6°$ F.; chlorodifluoromethane ($CHClF_2$), b.p. $-41.4°$ F.; fluorodichloromethane ($CHCl_2F$), b.p. $48.1°$ F.; fluorotrichloromethane ($CCl_3F$), b.p. $78.4°$ F. and tetrafluorodichloroethane ($CClF_2CClF_2$), b.p. $38.4°$ F.

A large number of refrigerants of different boiling temperatures and capacities are required to permit flexibility of design and the art is continually faced with the problem of providing new refrigerants as the need arises for new capacities and types of installations.

There is presently a demand in the industry for refrigerants suitable for use in systems having high condensing temperatures. An example of such is an automobile air conditioning system.

One difficulty encountered in this art is the provision of adequate refrigeration capacity in automobile air conditioning units when the engine is running at low speeds. $CCl_2F_2$ has been employed as a refrigerant in such systems. Unfortunately, $CCl_2F_2$ does not provide as much capacity at low engine speeds as would be desired. It would, accordingly, be preferred to use another single refrigerant composition exhibiting a higher capacity than $CCl_2F_2$ and which would exhibit other desirable characteristics for refrigeration purposes in such a system.

There obviously is only a limited number of halocarbon compounds which can be used as refrigerants. Unfortunately, there is no other single refrigerant composition known which exhibits a higher capacity than $CCl_2F_2$ in combination with other necessary and desirable characteristics for refrigeration purposes in an automotive air conditioning system.

It is known in the art to resort to the use of mixtures of halocarbon compounds to achieve new refrigerant compositions possessing characteristics different from either of the components making up that composition. Ordinary mixtures of halocarbons, however, result in compromised properties between the properties of the components and it is accordingly not possible to reach higher levels of capacities with such mixtures. Moreover, the use of ordinary mixtures entails a number of operating disadvantages, not the least of which is the fact that such mixtures can fractionate during the refrigeration cycle with consequent reduction of evaporator pressure and loss of efficiency. The tendency to fractionate also makes handling and reclamation of the refrigerant mixtures difficult.

On the other hand, mixtures of halocarbons which are azeotropic in nature, that is to say the vapor composition of which is the same or essentially the same as the liquid composition with which it is in equilibrium, are not subject to fractionation during the refrigeration cycle or upon handling as is the case with ordinary mixtures.

The advantages of an azeotropic mixtures as compared with a nonazeotropic mixture are well known to those skilled in the art. Unfortunately, however, as is also well known in the art, as evidenced by the disclosure in U.S. Pat. No. 3,085,065 to Kvalnes, there has not as yet been found by anyone a basis for the predictability of the formation of azeotropes between fluorocarbon compounds. Specifically, it has not been found that closeness in structure of one halocarbon compound to another halocarbon compound which forms an azeotrope is of any aid in predicting the formation of a new azeotrope. There are literally thousands of possible combinations of halocarbon compounds which comprise mixtures having advantageous additive refrigeration properties, but which are not azeotropic in nature.

2

Because of its high capacity and other desirable refrigeration characteristics, the known azeotrope of $CCl_2F_2$ and $CHF_2CHF_2$ (U.S. Pat. No. 3,085,065) has been considered as a candidate for use in systems using high condensing temperatures, such as automobile air conditioning units. It has been found, however, that this refrigerant mixture is unsatisfactory from another standpoint. Rubber hoses are commonly used for connecting various automobile air conditioning system components in order to provide sufficient flexiblity and to reduce vibration and noise. One problem these rubber hoses create is the loss of refrigerant therethrough by permeation. Any gas will pass through a porous membrane until the partial pressure of the gas on each side of the membrane is equal. The rate at which the permeation will take place depends on the nature of the gas, the nature of the porous membrane and the temperature and differential partial pressure in the system. In a refrigeration system the refrigerant will permeate through a rubber hose until it is eventually completely lost. If there is more than one component in the refrigerant, regardless of whether it is a simple mixture or an azeotropic mixture, the components will usually permeate at different rates, thereby causing the mixture to gradually change in composition. A change in the composition of a refrigerant mixture will result in change in refrigeration performance.

It has been found that, in actual use, the azeotrope of $CCl_2F_2$ and $CHF_2CHF_2$ changes significantly in composition after only relatively short periods of time. Specifically, the $CHF_2CHF_2$ component permeates through the rubber connecting hoses much faster than the $CCl_2F_2$ component. Thus the composition of the mixture changes relatively rapidly and the refrigeration characteristics of the mixture are altered.

It is accordingly an object of this invention to provide a novel halocarbon azeotropic system comprising an azeotropic mixture and a range of essentially azeotropic mixtures, which afford a new capacity level not previously known to be available from a single halocarbon refrigerant compound.

Another object of the invention is to provide a range of refrigerant mixtures which possess significantly higher capacity levels than $CCl_2F_2$.

Another object of the invention is to provide novel refrigerant mixtures, particularly suitable for use in systems having high condensing temperatures, such as automobile air conditioning systems.

Another object of the invention is to provide novel refrigerant mixtures which exhibit, in combination, lower permeability rates when confined by porous membranes, particularly rubber hoses, as compared with the known mixtures of $CCl_2F_2$ and $CHF_2CHF_2$.

Yet another object of the invention is to provide novel refrigerant mixtures possessing, in combination, higher capacity levels than $CCl_2F_2$.

It is another object of the invention to provide novel refrigerant mixtures which exhibit, in combination, only little composition change upon permeation through porous membranes.

Other objects and advantages of the invention will be apparent from the following description:

SUMMARY OF THE INVENTION

In accordance with the invention, it has been discovered that dichlorodifluoromethane ($CCl_2F_2$), b.p. $-21.6°$ F., and 1,1,1,2-tetrafluoroethane ($CF_3CH_2F$), b.p. $-15.7°$ F., in certain proportions, form an azeotropic mixture and essentially azeotropic mixtures, all of which mixture boil at a temperature lower than the minimum boiling $CCl_2F_2$ component.

The true azeotropic mixture of the invention consists of about 61 mol percent $CCl_2F_2$ and 39 mol percent $CF_3CH_2F$ at atmospheric pressure and has a normal boiling point of about $-30.1°$ F. The true azeotropic composition will, of course, vary with the pressure. The essentially azeotropic azeotropic mixtures possess boiling points and vapor pressures which are close to those of the true azeotropic mixture and which are lower and higher respectively than the corresponding properties of either of the azeotropic components. It can be seen, therefore, that the essentially azeotropic mixtures behave similarly to the true azeotropic mixtures as refrigerants. Accordingly, the essentially azeotropic mixtures and the true azeotropic mixture will hereinafter be referred to generically as "the azeotropic mixtures."

The azeotropic mixtures exhibit a number of desired properties for refrigeration purposes such as higher refrigeration capacities than either of the components, negligible flammability, low toxicity and others.

A highly unexpected property of the azeotropic mixtures found was that the subject mixtures possess surprisingly low permeability rates and exhibit little composition change when exposed to porous membranes, particularly rubber hoses, and, thus, may be used in automobile air conditioning systems for longer periods of time with little loss of refrigerant and little changes in refrigerant composition. This property is particularly significant to the art in view of the fact that the subject mixtures offer significantly higher refrigeration capacity than $CCl_2F_2$. These permeability characteristics of the subject refrigerant were unexpected in view of the fact that the very closely related azeotropic mixtures of U.S. Pat. No. 3,085,065 ($CCl_2F_2 2CHF_2$) exhibited such poor permeability characteristics. On the basis of comparative structure, there being one common component and one isomeric component as compared to the prior art azeotrope; it would have been predicted that the permeability characteristics of the novel azeotrope would be about the same.

A preferred class of the subject azeotropic mixtures are those which possess boiling points at 82.78 p.s.i.a. which are within about 1° C. of the boiling point of the azeotrope at this pressure (azeotrope at 82.78 p.s.i.a. is 54 mol percent of $CCl_2F_2/_3CH_2F$/b.p. 12.5° C./82.78 p.s.i.a.).

Such mixtures contain between about 27–70 mol percent $CF_3CH_2F$. All of these mixtures boil below the boiling point of the $CCl_2F_2$ component and exhibit little or no fractionation upon boiling. More preferred are mixtures containing between about 33–64 mol percent $CF_3CH_2F$ and which boil within 0.5° C. of the true azeotrope. Still preferred are mixtures containing between about 39–47 mol percent $CF_3CH_2F$. This range embraces the true azeotropic mixture under conditions from room temperature (25° C. -47 mol percent $CF_3CH_2F$) to the normal boiling point of the system (−30.1° F.—39 mol percent $CF_3CH_2F$). The mixture which defines the azeotrope at room temperature (47 mol percent $CF_3CH_2F$) is the preferred embodiment.

The azeotropic mixtures of the invention may be employed to produce refrigeration in a conventional manner by condensing the mixtures and thereafter evaporating said mixtures in the vicinity of a body to be cooled.

The azeotropic mixtures of the invention may also be used as aerosol propellants, power cycle fluids, gaseous dielectrics, heat transfer media and low-temperature solvents.

EXAMPLE 1

A sample of $CCl_2F_2$ was refluxed in a low temperature still at −21.6° F. (14.7 p.s.i.a.). A small amount of $CF_3CH_2F$ was then added to the sample and the resulting mixture was brought to reflux. After reflux, the temperature of the still at the head dropped to about −30.1° F. A fraction of the product which boiled constantly at −30.1° F. was removed and analyzed by gas chromatography analysis. The fraction was found to contain 60.6 mol percent $CCl_2F_2$ and 39.4 mol percent $CF_3CH_2F$.

EXAMPLE 2

The refrigeration capacities of the true azeotrope of the invention as compared with the highest capacity component, viz, $CCl_2F_2$, were compared on the basis of severe conditions which would exist in a typical automobile air conditioning unit. The reference conditions are shown in following table I:

TABLE I

| | |
|---|---|
| Condensing Temperature | 160° F. |
| Evaporating Temperature | 35° F. |
| Liquid Subcool 25° F. | |
| Super Heat Temperature | 65° F. |
| Evaporator Pressure Drop | 5 p.s.i. |

Table II indicates the comparative refrigeration performance of the $CCl_2F_2/CF_3CH_2F$ azeotrope as compared with $CCl_2F_2$ alone:

TABLE II

| | $CCl_2F_2$ | $CCl_2F_2/CF_3CH_2F$ (61 mol %/39 mol %) |
|---|---|---|
| Condensing Pressure (p.s.i.) | 280.8 | 348.7 |
| Evaporating Pressure (p.s.i.) | 47.3 | 58.4 |
| H.P./ton | 1.58 | 1.64 |
| C.F.M./ton | 4.75 | 3.87 |
| Relative Capacity | 100% | 123% |

As can readily be seen by the above data, the $CCl_2F_2/CF_3CH_2F$ azeotrope has a 23 percent greater capacity than $CCl_2F_2$ alone.

EXAMPLE 3

Tests were made to compare the permeability rates of the novel $CCl_2F_2/CF_3CH_2F$ azeotrope (61 mol percent/39 mol percent) with the prior art $CCl_2F_2/CHF_2CHF_2$ azeotrope (68.5 mol percent/ 31.5 mol percent). A standard automobile air conditioning unit Artic Kar 060863 (manufactured by Capitol Refrigeration of Dallas, Texas) was set up to duplicate actual use. The rubber tubing in the unit was the standard neoprene/buna-N laminate. The unit was driven by a 3 H.P. electric motor and was run at 1700 r.p.m.s. Provisions were made for the sampling of the refrigerant while the unit was in operation. On different occasions the unit was charged with 1297 grams of the $CCl_2F_2/CF_3CH_2F$ azeotrope and 1169 grams of the $CCl_2F_2/CHF_2CHF_2$ azeotrope. Samples of the refrigerants were taken after certain intervals, and the samples were analyzed by gas chromatography to determine the composition changes, if any. The results of the composition changes in the $CCl_2F_2/CHF_2CHF_2$ azeotrope are shown in Table III below:

TABLE III

| Time (Hours) | Mol Percent $CHF_2CHF_2$ |
|---|---|
| 0 | 23.8 |
| 336 | 19.6 |
| 528 | 17.8 |
| 720 | 15.1 |

The results of the composition changes in the $CCl_2F_2/CF_3CH_2F$ azeotrope are shown in Table IV below

TABLE IV

| Time (Hours) | Mol Percent $CF_3CH_2F$ |
|---|---|
| 0 | 35.9 |
| 1864 | 33.0 |

A summary of the comparison of the composition changes between the $CCl_2F_2/CHF_2CHF_2$ and $CCl_2F_2/CF_3CH_2F$ azeotropes, as a result of permeation of refrigerant through the rubber hoses on the basis of change in mol percent and change in mol percent per 1,000 hours is shown in the following Table V:

TABLE V

| Azeotrope | Time (Hours) | Change in Mol Percent | Change in Mol percent per 1,000 Hours |
| --- | --- | --- | --- |
| $CCl_2F_2/CHF_2CHF_2$ | 720 | 8.7 | 12.1 |
| $CCl_2F_2/CF_3CH_2F$ | 1864 | 2.9 | 1.56 |

The comparative permeation rates between the $CCl_2F_2/CHF_2CHF_2$ and $CCl_2F_2/CF_3CH_2F$ azeotropes were determined by measuring the total grams lost over various periods of time. The results are shown in following Table VI:

TABLE VI

| Azeotrope | Grams Lost | Hours | Grams/1,000 Hours |
| --- | --- | --- | --- |
| $CCl_2F_2/CHF_2CHF_2$ | 254 | 720 | 353 |
| $CCl_2F_2/CF_3CH_2F$ | 233 | 1,864 | 125 |

We claim:

1. Low-boiling mixtures consisting essentially of $CCl_2F_2$ and $CF_3CH_2F$ which possess boiling points lower than the boiling point of $CCl_2F_2$ and in which the mol percent of $CF_3CH_2F$ is in the range of about 27 to 70.

2. Mixtures according to claim 1 in which the mol percent of $CF_3CH_2F$ is in the range of about 33 to 64.

3. Mixtures according to claim 1 in which the mol percent of $CF_3CH_2F$ is in the range of about 39 to 47.

4. Mixtures according to claim 1 in which the mol percent of $CF_3CH_2F$ is about 47.

5. The process of producing refrigeration which comprises condensing a mixture as defined in claim 1 and thereafter evaporating said mixture in the vicinity of a body to be cooled.

6. The process according to claim 5 in which the mixture is as defined in claim 3.

7. The process according to claim 5 in which the mixture is as defined in claim 4.

8. The process according to claim 5 in which the mixture is as defined in claim 4.

PO-1050
(5/69)

UNITED STATES PATENT OFFICE
CERTIFICATE OF CORRECTION

Patent No. 3,607,755  Dated September 21, 1971

Inventor(s) Kevin Paul Murphy & Richard Frederick Harry Stahl

It is certified that error appears in the above-identified patent and that said Letters Patent are hereby corrected as shown below:

Column 1, line 64, the word "mixtures" should be --mixture--.

Column 2, line 69, the word "mixture" should be --mixtures--.

Column 2, line 75, delete the second "azeotropic" in that sentence.

Column 3, line 11, the word "refrigeration" should be --refrigerating--.

Column 3, line 26, the word "mixtures" should be --mixture--.

Column 3, line 27, the formula "$(CCl_2F_{22}CHF_2)$" should read --$(CCl_2F_2/CHF_2CHF_2)$--.

Column 3, line 37, in the formula, after that portion reading "$CCl_2F_2/$" delete "$_3CH_2F/b.p.$" and insert in lieu thereof --46 mol % $CF_3CH_2F/b.p.$--.

Column 4, Table I, 3rd condition (Liquid Subcool), delete "25°F." and insert it in the next column under 35°F.

Column 4, line 38, after the word "Kar" delete "O" and insert in lieu thereof --#--.

Claim 6, line 2, delete "3", insert in lieu thereof --2--.

Claim 7, line 2, delete "4", insert in lieu thereof --3--.

Signed and sealed this 20th day of March 1973.

(SEAL)
Attest:

EDWARD M. FLETCHER, JR.
Attesting Officer

ROBERT GOTTSCHALK
Commissioner of Patents